United States Patent [19]

Connan et al.

[11] Patent Number: 4,679,115
[45] Date of Patent: Jul. 7, 1987

[54] ELECTRICAL DISTURBANCE PROTECTIVE DEVICE BETWEEN A TERMINAL AND A TELEPHONE LINE

[76] Inventors: Jean-Louis Connan, Apartment AD 222, rue d'Anjou; Jean-Yves Huiban, Ker-Squivel-Izillian, Ploulech, both of, 22300 Lannion, France

[21] Appl. No.: 706,287

[22] Filed: Feb. 27, 1985

[30] Foreign Application Priority Data

Mar. 5, 1984 [FR] France ................... 84 03381

[51] Int. Cl.$^4$ .............................................. H02H 3/22
[52] U.S. Cl. ...................................... 361/119; 361/111; 379/379; 379/412
[58] Field of Search ............... 361/111, 118, 119; 250/551; 455/602, 610, 612; 307/311; 179/81 R

[56] References Cited

U.S. PATENT DOCUMENTS

| | | | |
|---|---|---|---|
| 3,126,452 | 3/1964 | Pettersson | 361/111 X |
| 3,558,830 | 1/1971 | Bender | 361/111 X |
| 3,648,110 | 3/1972 | Knight | 361/111 X |
| 4,015,115 | 3/1977 | Corcoran | 455/612 X |
| 4,110,570 | 8/1978 | Foster | 361/119 X |
| 4,249,266 | 2/1981 | Nakamori | 455/612 X |
| 4,420,841 | 12/1983 | Dudash | 250/551 X |
| 4,558,183 | 12/1985 | Corris et al. | 179/81 R X |

*Primary Examiner*—A. D. Pellinen
*Assistant Examiner*—A. Jonathan Wysocki
*Attorney, Agent, or Firm*—Laubscher & Laubscher

[57] ABSTRACT

The protective device affords electrical insulation at all times between a terminal and a telephone line, without any modification to the terminal, and protects a subscriber against any voltage surge (resulting from lightning, for example), and transmitted in the line. The device includes optical guides bidirectionally transmitting in particular voice, multifrequency and data signals and providing insulation between two interfaces respectively connected to the terminal and the line. One interface is fed with a remote supply current and the other is fed from the main power supply. The protective device can further include moving insulating rods for driving switching devices for the terminal to seize the line and for reproducing an interrupted ringing signal transmitted from the line to the terminal.

15 Claims, 4 Drawing Figures

ELECTRICAL DISTURBANCE PROTECTIVE DEVICE BETWEEN A TERMINAL AND A TELEPHONE LINE

BACKGROUND OF THE INVENTION

1. Field of the Invention

The present invention relates, generally speaking, to the protection of users of telephone and/or telematic terminals against voltage surges transmitted over telephone lines, such as those which are caused in particular from lightning.

2. Description of the Prior Art

During a telephone communication, a subscriber or customer is in liaison with a telephone line feeding a terminal via a handset or a keyboard included in the terminal. In current telephone and/or telematic terminals, a protective means including overvoltage protectors, such as spark-gap protectors or gas tubes, connected to ground is provided at the junction between the terminal and the telephone line. When the grounding connector is defective, a voltage surge generated in the telephone line from electrical disturbance, such as lightning or contact with a power lead, is transmitted to the subscriber via a member of the terminal, e.g. the handset or keyboard, that the subscriber is handling. This voltage surge causes serious disorders for the subscriber, due, for instance, to acoustic shock produced by agitation of the handset. Further, a high current can flow through the subscriber's body and in the worst of cases electrocute the subscriber.

A known telephone set without wires insulates the subscriber and handset from the telephone line only during the communication once the handset has been lifted and before hanging up said handset. The insulation consists of a bidirectional link, generally based on infrared radiation, between a first interface included in the moble handset and a second interface included in a fixed module and connected to the telephone line. However, the power supply to the second interface is drawn from the main power supply circuit via a transformer in order to provide sufficient power to feed optical signal emitting and receiving means in the second interface. Thus, when lifting and hanging up the handset, the subscriber is in contact with the fixed module, connected both to the telephone line and to the power supply across the transformer. The risks of transmitting electrical disturbance power to the subscriber are therefore higher than in the case of a conventional telephone set perfectly insulated from the power supply and drawing the necessary power from the remote supply current in the telephone line.

Furthermore, the infrared link is provided for long distance purposes, up to several meters. In both interfaces, the infrared means require optical signal transmitting and receiving means involving highly complex modulation and demodulation so as to minimize the effect of optical disturbance in the infrared link.

OBJECTS OF THE INVENTION

The main object of this invention is to provide a protective device interconnected between a terminal and a telephone line for protecting the terminal from electrical disturbance impressed in the telephone line.

A further object of the invention is to provide such a protective device affording electrical insulation at all times against very high voltages between the terminal in contact with the subscriber and the telephone line, without any additional modification to the terminal.

SUMMARY OF THE INVENTION

These and other objects of this invention are accomplished through an electrical disturbance protective device which comprises a first interface connected to the terminal, and a second interface connected to the telephone line. The first and second interfaces are separated by an insulating circuit including optical signal guiding means. The first and second interfaces comprise first transmitting means for converting first electrical signals, such as multifrequency, voice and data signals, delivered from the terminal into first optical signals to be applied to an entrance end of first optical guiding means, and first receiving means for converting said first optical signals outgoing from an emergent end of the first optical guiding means into the first electrical signals to be transmitted to the telephone line, respectively. The second and first interfaces comprise second transmitting means for converting second electrical signals transmitted from the telephone line into second optical signals to be applied to an entrance end of second optical guiding means, and second receiving means for converting the second optical signals outgoing from an emergent end of the second optical guiding means into the second electrical signals to be transmitted to the terminal, respectively.

The first interface comprises first means for feeding current from the power supply to said terminal, the first transmitting means and the second receiving means. The second interface comprises second means for feeding remote supply current from the telephone line to the first receiving means and the second transmitting means. Thus, in accordance with the invention, the first interface and the terminal are supplied by the power supply and the second interface is supplied by the remote supply current in the telephone line, thereby ensuring perfect electrical insulation between the power supply at the subscriber's terminal and the telephone line via the optical signal guiding means.

A further feature of the invention is that the means for guiding the first and second optical signals consists of tubes made of electrically insulating material with opaque walls or optical fibers running between boxes housing the interfaces. The optical signals are thus protected against any outside optical disturbance. Under these conditions, the transmitting means can feed the base band electrical signals directly, without any intermediate modulation, to photosensitive members. The cost of the protective device embodying the invention is hence lower than that for an infra-red wireless telephone set.

A further aspect fo the invention is that the means for guiding the optical signals are a few tens of centimetres long in order to provide electrical insulation greater than at least 300 kV between the two interfaces. The shortness of the guiding means results in only a low optical radiation power requirement in the transmitting means. In particular, the remote supply current in the telephone line, on the order 30 mA, is sufficient for supplying the second transmitting means and the first receiving means included in the second interface.

A further characteristic of the invention is that the transmitting and receiving means both in the first and second interfaces are fed only while the terminal is in operation condition, which reduces the power consumption of the protective device.

BRIEF DESCRIPTION OF THE DRAWING

Further objects, features and advantages of the invention will be apparent from the following detailed description of several preferred embodiments of the invention with reference to the corresponding accompanying drawings in which.

DETAILED DESCRIPTION OF THE PREFERRED EMBODIMENTS

Figure 1:
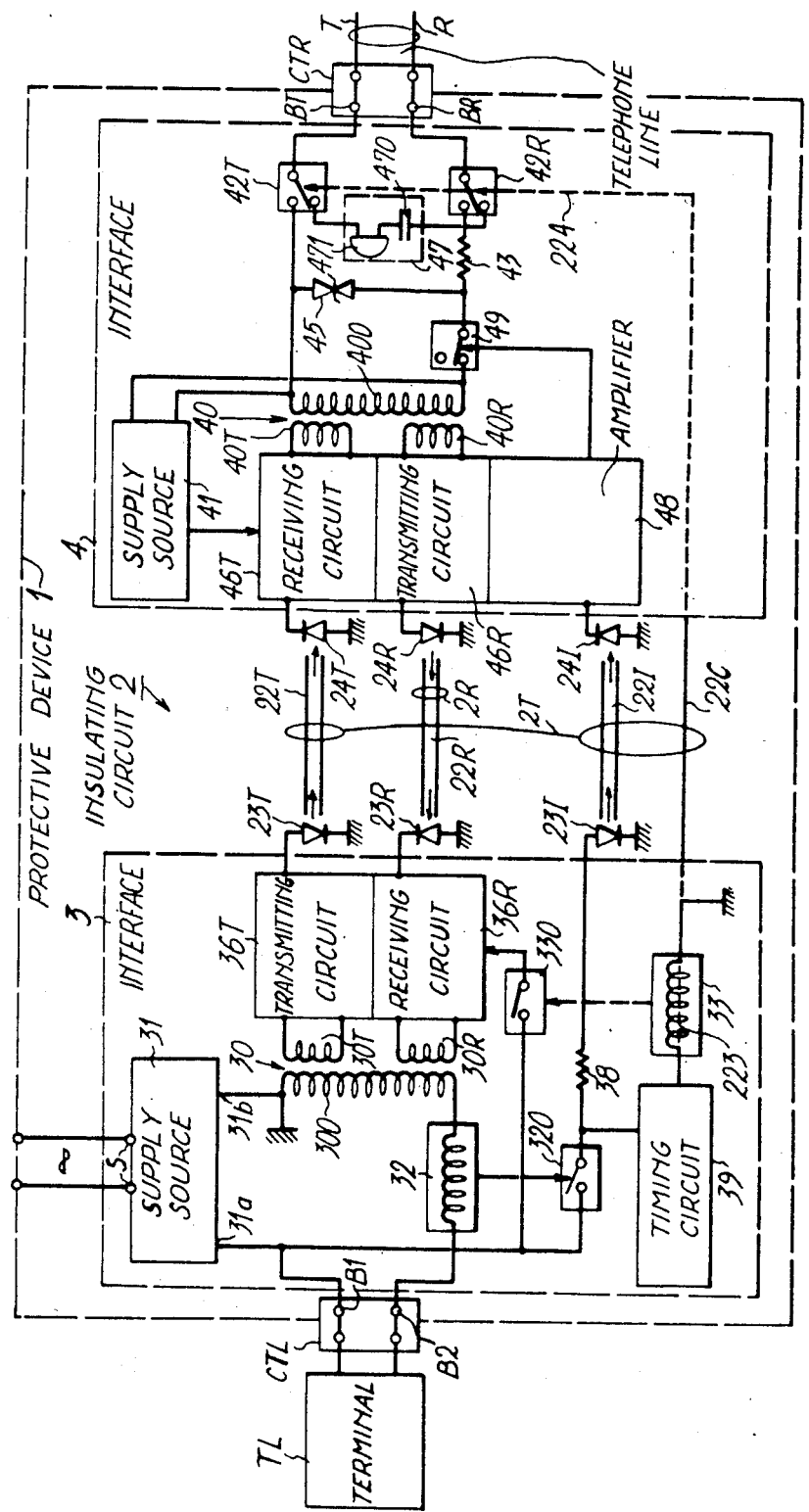
FIG. 1 is a detailed block diagram of a protective device embodying the invention, interconnected between a terminal and a telephone line.

As depicted in FIG. 1, protective device 1 embodying the invention is a quadripole interconnected between two connection terminals of a terminal TL and ends of two wires T and R of a telephone line.

Generally speaking, the terminal TL can be a subscriber telephone installation with one or more telephone sets, or a single telephone set. The terminal TL can be a subscriber telephone and telematic installation that via a common bus feeds one more more telephone sets, and one or more known keyboard and screen type telematic terminals. The telephone line TR can be a subscriber line linked a to an associated switching facility, such as local telephone and/or telematic office. However, the telephone link can be a tie or special telephone line and the terminal can be monitoring equipment such as measuring apparatus that tests, for instance, line transmission faults.

Hereinafter, it is assumed that the terminal can transmit and receive all types of pulse or multifrequency signals in the audio-frequency band, lying typically from 300 Hz to 3400 or 4000 Hz. The pulse signals are dialling signals transmitted by a telephone set having a dial. Such dialling signals consist of streams of suitably calibrated pulses representing the figures of a called number. Each pulse results conventionally in a subscriber loop opening in the telephone line. When a telephone set includes a multifrequency generator and a keyboard, multifrequency dialling signals are transmitted and result generally from a combination of two frequencies from among eight. Data signals can also be transmitted in the telephone line and arise from digital signals that have undergone bivalent series modulation achieved by frequency shifting using modems, where a nominal mean frequency is ascribed to each of the two transmission directions.

All the signals defined hereinabove are carried in both transmission directions beteen the terminal TL and the telephone line TR across protective device 1. Two first connection terminals B1 and B2 of device 1 are connected to two connection terminals of terminal TL via a first conventional circuit-closer CLT analogous to a telephone connector. Two second connection terminals BT and BR of device 1 are connected to ends of the telephone line wires T and R via a second circuit-closer CTR.

Protective device 1 comprises an electrically insulating optoelectronic circuit 2 having separate channels for the two transmission directions, and on either side of circuit 2, a first interface 3 on the terminal TL side and a second interface 4 on the telephone line TR side. Both interfaces 3 and 4 comprise hybrid couplers, in the form for example of differential transformers 30 and 40, for matching the bidirectional transmissions over two wires at the terminal TL and telephone line TR with a transmitting channel 2T and a receiving channel 2R in circuit 2.

In first interface 3, a primary winding 300 of transformer 30 is interconnected between a negative or grounded terminal 31b of a supply source 31 and a terminal of a coil 32 in a first relay. Other positive terminal 31a of source 31 and another terminal of coil 32 are connected to the connection terminals of the terminal TL via device terminals B1 and B2 and the circuit-closer CTL, respectively. Supply source 31 is quite conventional and carries two input connections S connected to the main power supply. Source 31 delivers the loopback current required to operate the terminal TL and first interface 3. Preferably, source 31 comprises a stand-by battery to power the terminal TL should there be a power interruption in the main power supply.

First voice and multifrequency electrical signals transmitted from the terminal TL are picked up by a first secondary winding 30T of differential transformer 30 forming an input to a first transmitting medium (22T) of the transmitting channel 2T. The first transmitting medium comprises in insulating circuit 2, a photoemitter 23T connected to winding 30T via a transmitting circuit 36T, a photoreceiver 24T and an optical guide 22T. Transmitting circuit 36T and photoemitter 23T constitute first transmitting means for converting the first electrical signals into first optical signals. Guide 22T carries the first optical signals emitted from photoemitter 23T to photoreceiver 24T and corresponding to the first voice and multifrequency electrical signals transmitted by the terminal TL. An output from the first transmitting medium consists of a first secondary winding 40T of differential transformer 40 in second interface 4. Winding 40T is connected to photoreceiver 24T via a receiving circuit 46T. Photoreceiver 24T and receiving circuit 46T form first receiving means for converting the first optical signals into the first electrical signals. The voice and multi-frequency signals transmitted from terminal TL are next carried to line TR through a primary winding 400 in transformer 40. The wire T is connected to a terminal of winding 400 via a movable contact and a first stationary contact of a first switch means 42T. The wire R is connected to another terminal of winding 400 via a movable contact and a first stationary contact of a second switch means 42R and through a protective resistor 43. A dual Zener diode 45 is interconnected to the terminals of primary winding 400. Components 43 and 45 constitute means for protecting the circuits in interface 4, by clipping any voltage surges that might occur.

Second voice multifrequency electrical signals transmitted from the telephone line TR to the terminal TL flow along receiving channel 2R that is analogous in composition to the first transmitting medium. Input into and output from receiving channel 2R are formed of second secondary windings 40R and 30R of differential transformers 30 and 40 respectively. Receiving channel 2R comprises a photoemitter 24R connected to winding 40R through a transmitting circuit 46R, a photoreceiver 23R connected to winding 30R via a receiving circuit 36R, and an optical guide 22R. Guide 22R carries second optical signals emitted by photoemitter 24R to photoreciever 23R and corresponding to the voice and multifrequency signals transmitted from line TR.

In insulating circuit 2, photoemitters, such as photoemitters 23T and 24R, are for instance photomissive diodes such as light emitting diodes (LED) emitting in the near infrared with a wavelength on the order of 950 nm. The photomissive diodes are preferably biased by a direct current modulated by base-band signals corresponding to the voice and multifrequency signals and work in a linear state. These conditions are achieved by means of known amplifiers forming transmitting circuits 36T and 46R. Likewise, recieving circuits 46T and 36R consist of known amplifiers.

Figure 2:
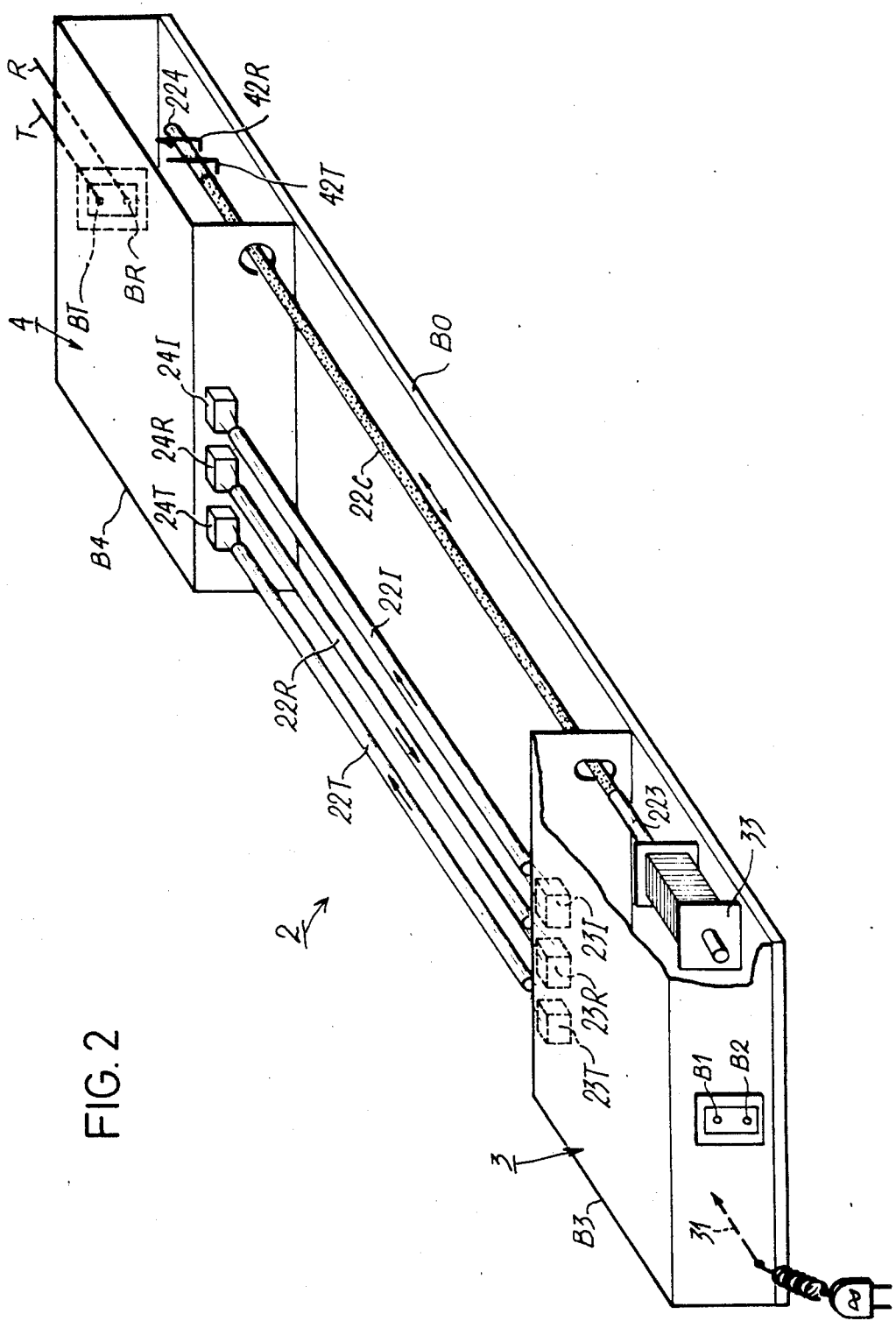
FIG. 2 is a view in perspective of boxes or casings containing first and second device interfaces between which extend optical guides and an insulating rod.

The lengths of optical guides 22T and 22R are determined in terms of required electrical insulation. The galvanic insulation thus obtained between interfaces 3 and 4, i.e. between terminal TL and line TR, is greater than that obtained using known optoelectronic photocouplers. By way of an example, optical guides 22R and 22T are approximately 30 cm long for a desired electrical insulation to voltages of 900 kV. Given the shortness of the otpical guides, a biasing current to diodes 23T and 24R of about 5 mA is sufficient. Optical guides 22T and 22R consist of tubes made of insulating opaque walls and ends secured to base members accommodating the photoemitters and photoreceivers, as depicted schematically in FIG. 2. In a further embodiment, optical guides 22T and 22R consist of optical fibers having ends placed opposite the respective photoemitters and photoreceivers in known boxes. Photoreceivers 24T and 23R are, for instance, photosensitive junction components such as phototransistors or photodiodes. As shown in FIG. 2, interfaces 3 and 4 are housed inside small boxes B3 and B4 secured to the bottom of an insulating material box B0. Guides 22T and 22R run parallel between the boxes B3 and B4.

The circuits in second interface 4, such as transmitting circuit 46R and receiving circuit 46T, are supplied from a supply circuit 41 that draws a necessary power from a remote supply current in the telephone line TR. Supply circuit 41 is a known arrangement comprising a rectifier. Input terminal of supply circuit 41 are connected respectively to the terminals of primary winding 400 of transformer 40. As a result, second interface 4 is power-supplied with the remote supply current in the telephone line TR, and first interface 3 and terminal TL are power-supplied from the main power supply via source 31. The telephone line is therefore completely insulated from the main power supply owing to insulating circuit 2, and any high voltage surge, caused in particular from lightning, appearing in line TR will damage only second interface 4 without adversely affecting terminal TL and first interface 3 and without bothering the subscriber or customer.

In second interface 4, switch means 42T and 42R play the role of switch hooks in a conventional telephone set. However, switch means 42T and 42R can be done away with when terminal TL is an apparatus permanently connectable to telephone line TR. Second stationary contacts of switch means 42T and 42R constitute terminals of a call circuit 47 including a capacitor 470 and a call bell 471. According to the invention, means also insulating both interfaces 3 and 4 in protective drive 1 is provided to drive switch means 42T and 42R during conventional operations of lifting and hanging up a handset of a telephone set included in the terminal TL, or more generally during the operations of switching on and off the terminal TL corresponding to establishing and breaking a telephone communication.

The means for driving switch means 42T and 42R comprises coil 32 of the first relay, a make contact 320 controlled by the first relay, a coil 33 of a second relay, and a make contact 330 controlled by the second relay included in first interface 3, as well as moving insulating rod 22C running through circuit 2. Contact 320, timing circuit 39, and coil 33 are connected in series between terminal 31a and ground, and this with grounded terminal 31b of supply source 31. Contact 330 connects terminal 31a to supply terminals of transmitting circuit 36T and receiving circuit 36R. Rod 22C is movable parallel with to optical guides 22T and 22R between the two boxes B3 and B4 which contain interfaces 3 and 4, respectively, as depicted schematically in FIG. 2. Rod 22C is composed of a central portion made of an insulating material between boxes B3 and B4 and two metal terminal portions 223 and 224 interal with ends of the insulating central portion and sliding in the boxes including interfaces 3 and 4. Metal portion 223 of rod 22C forms an armature for relay 33. Other metal portion 224 of rod 22C is interal with the movable contacts of switch means 42T and 42R.

First relay 32 is activated once the current loop in first interface 3 is closed when the terminal TL is switched on, which corresponds to the start of an operational phase of the terminal TL. When closing the current loop, this is detected by coil 32 that closes contact 32. When contact 320 closes, this causes second relay 33 to be activated. Contact 330 is closed to feed circuits 36T and 36R. Insulating rod 22C moves axially, whereby switch means 42T and 42R connect wires T and R to the terminals of primary winding 400 and supply circuit 41 and disconnect call circuit 47. Transmitting circuit 46R and receiving circuit 46T in second interface 4 are thus fed by circuit 41 as soon as line TR is seized, at the same time as transmitting circuit 36T and receiving circuit 36R in first interface 3 are fed by supply source 31. Circuits 36T, 36R, 46T and 46R are thus fed solely during a telephone communication.

At the end of the terminal operational phase, i.e. when terminal TL stops as at the end of the communication, the current loop in interface 3 and terminal TL opens thereby setting the first and second relays to the resting or de-energized condition, which opens contacts 320 and 330, axially returns rod 22C and causes the movable contacts in switch means 42T and 42R to move out of engagement with the first stationary contacts and to move into engagement with the second stationary contacts wherein telephone line TR is terminal with call circuit 47. Circuits 36T, 36R, 46T and 46R are no longer supplied with power.

Protective device 1 as described above is intended for a terminal where the dialling signals are multifrequency signals. As already stated, such signals flow through transmitting circuit 36T and receiving circuit 46T via first transmitting medium 23T-22T-24T of the transmitting channel 2T.

When the terminal TL delivers pulse coded dialling signals, transmitting channel 2T comprises a third transmitting medium to reproduce currrent loop opening and closure in second interface 4. The third transmitting medium consists of members analogous to those in the first transmitting medium, namely a photoemitter 23I, an optical guide 22I and a photoreceiver 24I. Photoemitter 23I is biased via contact 320 and a resistor 38 in interface 3. Photoreceiver 24I is connected to an input of an amplifier 48 having an output driving a breaker 49 in interface 4. Breaker 49 is interconnected in one of the wires in the line TR, for instance between a terminal common to resistor 43 and an anode of dual diode 45 and a terminal common to supply source 41 and primary winding 400, on the wire R side. Breaker 49 can be a make contact of a relay or a field effect transistor gate.

In protective device 1 intended for a terminal delivering pulse coded dialling signals, interface 3 further comprises a timing circuit 39, in the form of an integrator, interconnected between contact 320 and coil 33.

Every dialling pulse corresponding to a current loop opening in interface 3 and terminal TL is detected by coil 32 of the first relay that momentarily opens contact 320. Timing circuit 39 inhibits loop opening such that second relay 33 remains activated whilst the loop is opening and switch means 42T and 42R do not change condition and line TR remains seized. Loop opening is retransmitted in the form of a brief period of screening by third transmitting medium 23I-22I-24I. Amplifier 48 then briefly opens breaker 49 that thus conventionally reproduces the opening of a current loop in line TR. Photoemitter 23I consisting also of a light emitting diode, retransmits light pulses at the rate of the dialling pulses reproduced in electrical pulses by breaker 49, by assuming electrical insulation between interfaces 3 and 4.

In a further embodiment, the voice and multifrequency signals delivered from terminal TL and line TR do not directly modulate the emission from photoemittive diodes 23T and 24R but are first of all modulated by pulses that themselves modulate the emission from the photoemittive diodes. The pulse modulation can be position-wise or width-wise. In this case, transmitting circuits 36T and 46R are replaced by pulse modulators, and receiving circuits 36R and 46T are replaced by pulse demodulators. One of the interfaces, such as interface 3, contains a clock deriving a clock signal with an 8 kHz sampling frequency. The clock signal is used both in modulator 36T for modulating the signals dlivered by terminal TL, and in demodulator 36R for demodulating signals received by photoreceiver 23R. The other interface, such as interface 4, comprises a clock recovering circuit for reproducing the clock signal that is used for pulse modulation of the signal delivered from line TR into modulator 46R. Thus, the modulation and demodulation operations carried out in both interfaces 3 and 4 are synchronous.

However, it is observed that the pulse modulation increases the cost of the protective device compared to direct modulation of the emission from the photoemitters by the voice and multifrequency signals. Pulse modulation is generally used in long infrared transmissions where all outside disturbance on the optical signals must be attenuated.

In addition, pulse modulation makes it possible to do away with third transmitting medium 23I-22I-24I in the transmitting channel. Indeed, the dialling pulses can be modulated by modulator 36T and can be reformed by demodulator 46T. In this instance, during loop opening in interface 3 and terminal TL, diode 23T is prevented from emitting modulating pulses. In demodulator 46T, loop closure is reconstituted by means of a monostable flip-flop retriggerble by a rise front of each received pulse and having a time constant longer than the sampling period equal to 125 μs.

In other embodiments, pulse modulation can be replaced by any other known type of modulation, such as frequency modulation or amplitude modulation.

Figure 3:
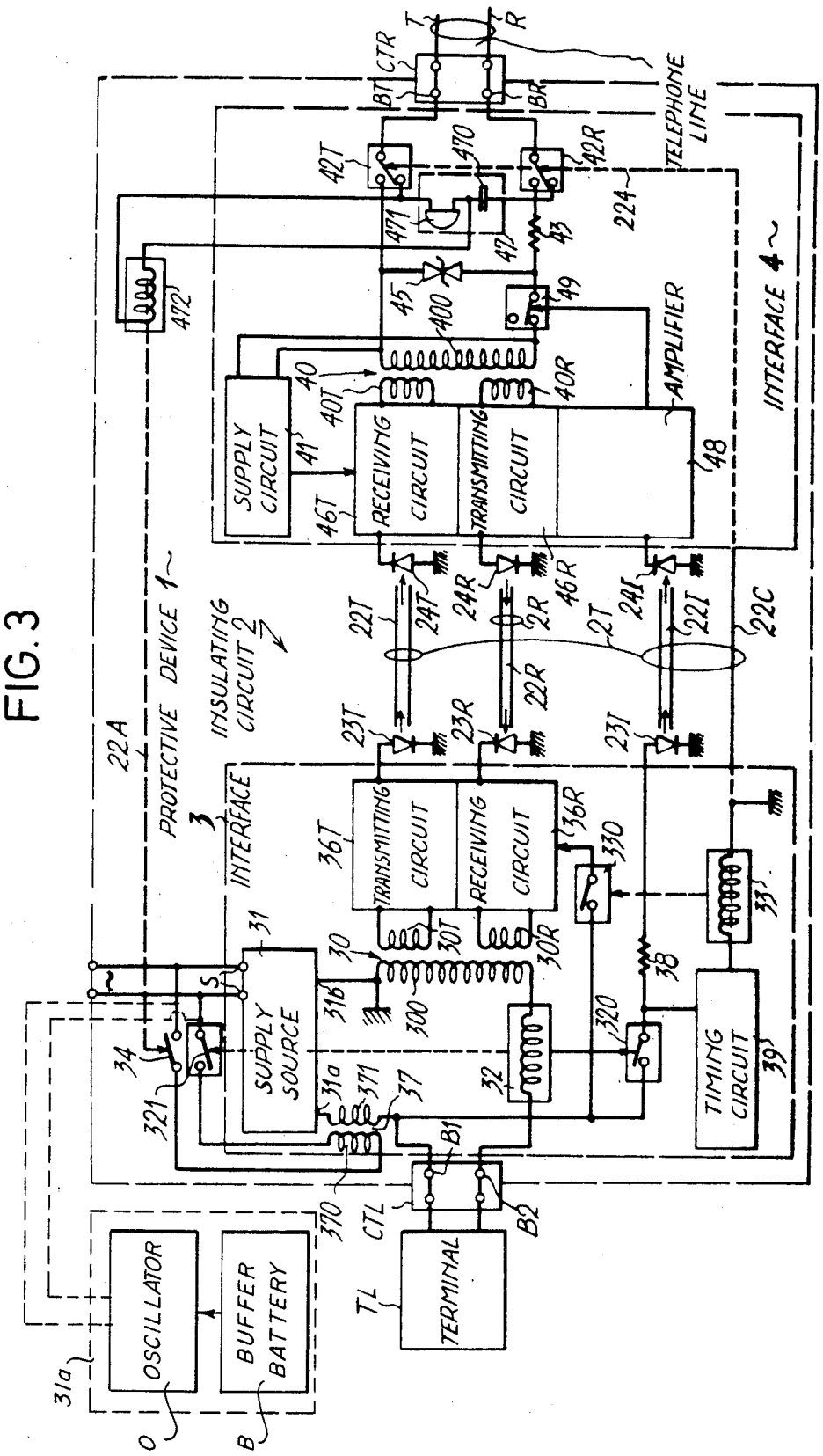
FIG. 3 is a block diagram of a protective device embodying the invention adapted to reproduce a call signal transmitted from the telephone line in the terminal.
Figure 4:
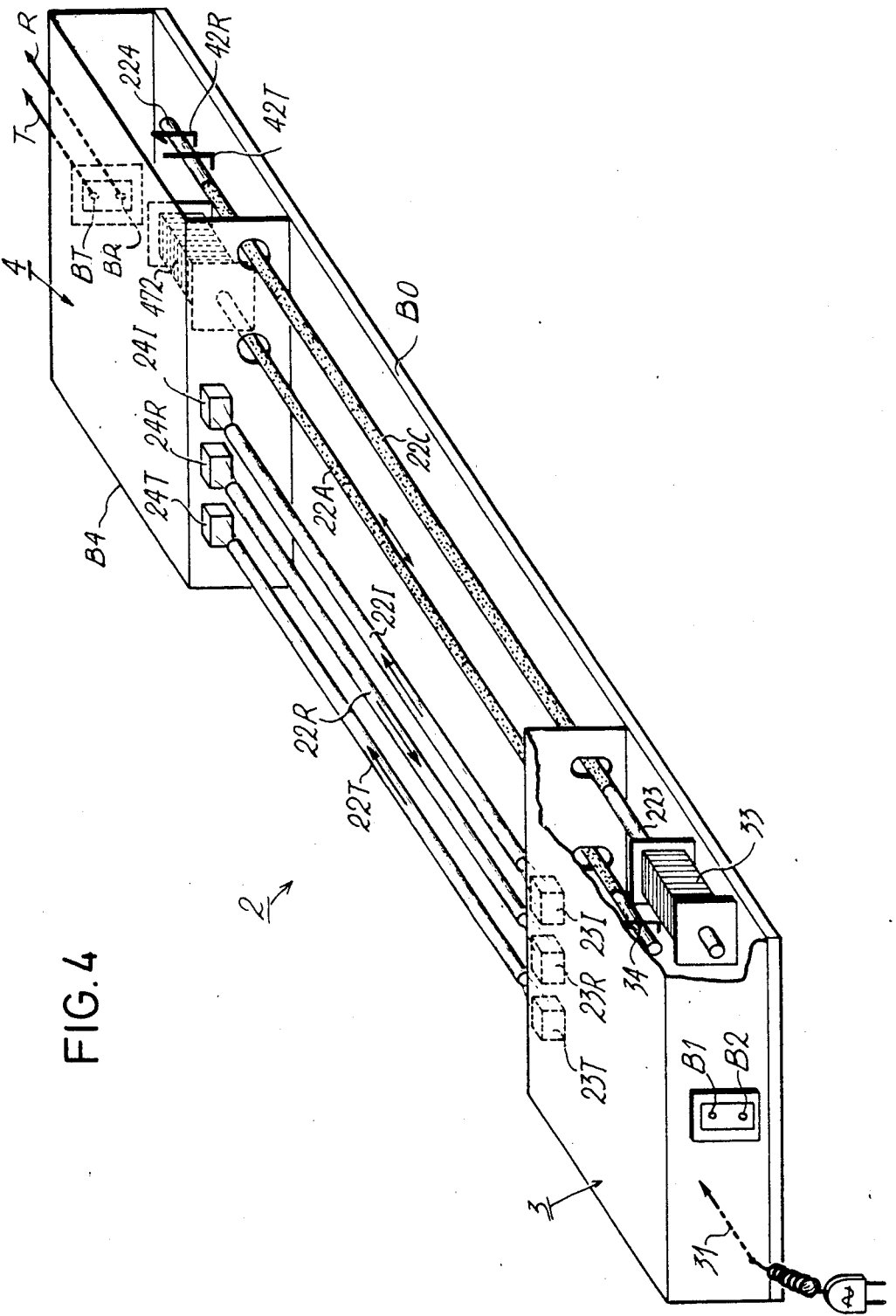
FIG. 4 is a view in perspective analogous to FIG. 2, in relation to the device shown in FIG. 3.

Referring to FIGS. 3 and 4, in one embodiment modified to that described in the foregoing, means is provided for transmitting an interrupted ringing signal from line TR to terminal TL via protective device 1. This modified embodiment is illutrated in FIGS. 3 and 4 that show all the components already described as included in insulating circuit 2 and interfaces 3 and 4.

In second interface 4, a relay coil 472 is connected in parallel with call bell 471 or replaces the call bell. In first interface 3, a transformer 37 as well as a call contact 34 and a breaking contact 321 are added. A secondary winding 371 in transformer 37 connects terminal 31a of supply source 31 to terminal B1 of circuitcloser CTL. A primary winding 370 in transformer 37 and contacts 34 and 321 are series-connected in a branch arranged in parallel with the main power supply input terminals S of supply source 31. Contact 321 is controlled by relay coil 32 and is opened simultaneously with first contact 320 being closed when the terminal TL enters the operational phase, simulating a handset being lifted in a conventional telephone set. A movable portion of contact 34 is driven by an end of a second moving rod 22A having a central portion made of insulating material and running through insulating circuit 2. Rod 22A is analogous with rod 22C and parallel therewith as shown schematically in FIG. 4. Another metal end of rod 22A forms an armature for call relay 472 in interface 4.

As a result, an interrupted ringing signal transmitted from line TR activates relay 472 that produces a axial to-and-fro movement in rod 22A and the movable portion of contact 34 in step with interruptions in the ringing signal. With contact 321 closed, contact 34 reproduces the periodic interruptions in the ringing signal in the form of periodic breaks in the power supply S alternating current supply that are transmitted to terminal TL via transformer 37 to excite a call bell (not shown) included in terminal TL. When terminal TL commences working, this closes the current loop in interface 3, thereby activating relay 32 and consequently closing contact 320 and opening contact 321. When contact 321 opens, this breaks the call ringing current in interface 3 at the same time as call circuit 47 including coil 472 is disconnected from line TR by switch means 42T and 42R being thrown by relay 33 that is activated by closure of contact 320. Dialling, voice or data signals can then be transmitted as described with reference to FIGS. 1 and 2.

In a further embodiment, when supply source 313 comprises a buffer battery, the battery B feeds an oscilator O deriving an alternating signal to the terminal of the branch comprising contacts 34 and 321 and primary winding 370. In this branch, the power supply current is replaced by the alternating signal produced by the oscilator, and the ringing signal produced in interface 3 is no longer affected by any failures in the power supply.

By way of the invention in the various embodiments described in the foregoing, it is possible to fit out each telephone subscriber's premises both straightforwardly and cheaply with a protective box BO in place of the expensive ground connector currently in use.

When the telephone line is a four-wire digital line, there is no longer any need to match a two-wire line with a four-wire line and the protective device no longer includes differential transformers 30 and 40; the receiving circuit 46T transmits directly digital signals arising from said terminal TL to two wires of the line 3, and the transmitting circuit 46R receives directly digital signals from said line. If the telephone line comprises a four-wire data and voice channel and a four-wire digital signalling channel, the insulating circuit of the protective device then comprises two pairs of transmitting channels and receiving channels, such as the pair of channels 23T-22T-24T and 24R-22R-23R.

In a further embodiment, the telephone line can consist of a wide-band coaxial cable or two wide-band coaxial cables ascribed to the two transmission directions. In this instance, the terminal can include a visiophone, a television receiver or a magnetoscope for example.

What we claim is:

1. An electrical disturbance protective system connected between a terminal (TL) and a telephone line (TR), comprising:
   (a) first (3) and second (4) interfaces connected with the terminal and with the telephone line via first (CTL) and second (CTR) telephone circuit closers, respectively, said first interface including first transmitting means (23T) for converting first electrical signals delivered from said terminal into first optical signals, and said second interface means including first receiving means (24T) for reconverting said first optical signals back into said first electrical signals for introduction into the telephone line; said second interface including second transmitting means (24R) for converting electrical signals supplied by said telephone line into second optical signals, and said first interface including second receiving means (23R) for reconverting said second optical signals back into said second electrical signals for transmission to said terminal; said first interface including third transmitting means (23I) for transmitting third optical pulses corresponding with current loop pulses derived from the terminal during a dialling period thereof, said second interface including third receiving means (24I) for reconverting said third optical pulses into current loop pulses for transmission into the telephone line;
   (b) first (22T), second (22R) and third (22I) electrical insulating means for guiding said first, second, and third optical signals, respectively, between said first and second interfaces;
   (c) said first interface including first supply circuit means (31) for supplying power from an alternatingcurrent source thereof (S) to said first and third transmitting means and said second receiving means, said first supply circuit means also supplying power to said terminal via said first telephone circuit closer (CTC);
   (d) said second interface further including second supply circuit means (41) for supplying from said telephone line remote power to said second transmitting means and said first and third receiving means.

2. Apparatus as defined in claim 1, and further wherein
   (e) said first interface includes detecting means (33, 330) for connecting said first transmitting means and said second receiving means with said first power suppply circuit only during an operating period of said terminal;
   (f) said second interface means including switch means (42T,42R) operable by said detecting means for connecting said telephone line with said first receiving means and said second transmitting means only during said terminal operating period.

3. Apparatus as defined in claim 1, and further including means (39) for maintaining the connection between said first power supply circuit and said first transmitting means and said second receiving means for current loop pulses derived from said terminal.

4. Apparatus as claimed in claim 1, wherein said guiding means are tubes made of electrically insulating material with opaque walls.

5. Apparatus as claimed in claim 1, wherein said guiding means are optical fibers.

6. Apparatus as claimed in claim 1, wherein said first and second transmitting means comprise photoemissive members for directly converting said first and second electrical signals in base-band, without any intermediate modulation, into said first and second optical signals, respectively.

7. Apparatus as claimed in claim 1, comprising means (472,37) for carrying an interrupted ringing signal from said line to said terminal.

8. Apparatus as defined in claim 1, wherein the telephone line is a digital four-wire line, wherein said first and second electrical signals are digital signals, wherein said first receiving means transmits directly said first digital signals to two wires of said line, and wherein said second transmitting means receives directly said second digital signals from other two wires of said line.

9. Apparatus as claimed in claim 1, comprising means (472) included in said second interface for detecting interruptions in an interrupted ringing signal delivered from said telephone line, and means (34,37) included in said first interface and driven by said detecting means for reproducing said ringing signal interruptions in the form of breaks in an alternating signal derived in said first interface.

10. The electrical disturbance protective device claimed in claim 9, wherein said first interface includes means (321) for stopping the derivation of said alternating signal breaks to said terminal while said terminal is operating.

11. The electrical disturbance protective device claimed in claim 9, wherein said alternating signal is derived directly form the input to said first power supply circuit.

12. Apparatus as defined in claim 9, wherein said first supply circuit means comprises a buffer battery, and oscillating means connected with said battery for deriving said alternating signal.

13. An electrical disturbance protective system connected between a terminal (TL) and a telephone line (TR), comprising:
   (a) first and second (4) interfaces connected with the terminal and with the telephone line, respectively, said first interface including first transmitting means (23T) for converting first electrical signals delivered from said terminal into first optical signals, and said second interface means including first receiving means (24T) for reconverting said first optical signals back into said first electrical signals for introduction into the telephone line; said second interface including second transmitting means (24R) for converting electrical signals supplied by said telephone line into second optical signals, and said first interface including second receiving means (23R) for reconverting said second optical signals back into said second electrical signals for transmission to said terminal; said first interface including third transmitting means (23I) for transmitting third optical pulses corresponding with current loop pulses derived from the terminal during a dialling period thereof, said second interface including third receiving means (24I) for reconverting said third optical pulses into current loop pulses for transmission into the telephone line; and (b) first (22T), second (22R) and third (22I) electrical insulating means for guiding said first, second, and third optical signals, respectively, between said first and second interfaces;

(c) said first interface including first supply circuit means (31) for supplying power from an alternatingcurrent source thereof (S) to said first and third transmitting means and said second receiving means;

(d) said second interface further including second suppy circuit means (41) for supplying from said telephone line remote power to said second transmitting means and said first and third receiving means;

(e) said first interface further including detecting means (33,330) for connecting said first transmeans and said second receiving means with said first power supply circuit only during an operating period of said terminal;

(f) said second interface means including switch means (42T,42R) operable by said detecting means for connecting said telephone line with said first receiving means and said second transmitting means only during said terminal operating period, said detecting means including a relay (33), and a movable rod (22C) extending between said first and second interfaces and operable by said relay for operating said switch means, said rod being formed of insulating material and including at one end a metal portion (223) that serves as a armature for said relay.

14. An electrical disturbance protective system connected between a terminal (TL) and a telephone line (TR), comprising:

(a) first (3) and second (4) interfaces connected with the terminal and with the telephone line, respectively, said first interface including first transmitting means (23T) for converting first electrical signals delivered from said terminal into first optical signals, and said second interface means including first receiving means (24T) for reconverting said first optical signals back into said first electrical signals for introduction into the telephone line; said second interface including second transmitting means (24R) for converting electrical signals supplied by said telephone line into second optical signals, and said first interface including second receiving means (23R) for reconverting said second optical signals back into said second electrical signals for transmission to said terminal; said first interface including third transmitting means (23I) for transmitting third optical pulses corresponding with current loop pulses derived from the terminal during a dialling period thereof, said second interface including third receiving means (24I) for reconverting said third optical pulses into current loop pulses for transmission into the telephone line;

(b) first (22T), second (22R) and third (22I) electrical insulating means for guiding said first, second, and third optical signals, respectively, between said first and second interfaces;

(c) said first interface including first supply circuit means (31) for supplying power from an alternating-current source thereof (S) to said first and third transmitting means and said second receiving means;

(d) said second interface further including second supply circuit means (41) for supplying from said telephone line remote power to said second transmitting means and said first and third receiving means, and relay means (472) included in said second interface for detecting interruptions in an interrupted ringing signal delivered from said telephone line;

(f) means including a switch (34) arranged in said first interface for reproducing said ringing signal interruptions in the form of breaks in an alternating-current signal derived in said first interface; and (g) a movable fifth insulating rod (22A) arranged between said first and second interfaces, said fifth rod being operable by said relay means to operate said switch.

15. The electrical disturbance protective device claimed in claim 14, wherein said second interface includes a call bell, and further wherein said relay is connected in parallel with said call bell.

* * * * *